(12) United States Patent
Elhofy (10) Patent No.: US 12,544,394 B2
(45) Date of Patent: Feb. 10, 2026

(54) COMPOSITIONS AND METHODS FOR TREATMENT OF FIBROSIS

(71) Applicant: BAST BIOTECHNOLOGY, Chicago, IL (US)

(72) Inventor: Adam Elhofy, Chicago, IL (US)

(73) Assignee: BAST BIOTECHNOLOGY, Chicago, IL (US)

( * ) Notice: Subject to any disclaimer, the term of this patent is extended or adjusted under 35 U.S.C. 154(b) by 0 days.

(21) Appl. No.: 16/755,245

(22) PCT Filed: Oct. 11, 2018

(86) PCT No.: PCT/US2018/055521
§ 371 (c)(1),
(2) Date: Apr. 10, 2020

(87) PCT Pub. No.: WO2019/075277
PCT Pub. Date: Apr. 18, 2019

(65) Prior Publication Data
US 2020/0246361 A1 Aug. 6, 2020

Related U.S. Application Data

(60) Provisional application No. 62/570,847, filed on Oct. 11, 2017.

(51) Int. Cl.
*A61K 31/685* (2006.01)
*A61K 9/127* (2006.01)
*A61K 31/355* (2006.01)
*A61K 45/06* (2006.01)

(52) U.S. Cl.
CPC ............ *A61K 31/685* (2013.01); *A61K 9/127* (2013.01); *A61K 31/355* (2013.01); *A61K 45/06* (2013.01)

(58) Field of Classification Search
CPC .... A61K 31/685; A61K 9/127; A61K 31/355; A61K 45/06; A61K 2300/00; A61K 9/51; A61K 31/661; A61K 47/22; A61K 47/42; A61K 47/28; A61K 31/575; A61P 43/00; A61P 1/16; A61P 11/00
See application file for complete search history.

(56) References Cited

U.S. PATENT DOCUMENTS

| | | | |
|---|---|---|---|
| 5,284,835 A * | 2/1994 | Lieber | A61P 1/16 514/76 |
| 6,217,899 B1 | 4/2001 | Benameur et al. | |
| 2004/0146516 A1 * | 7/2004 | Roben | A61K 47/6898 424/178.1 |
| 2006/0115523 A1 * | 6/2006 | Konduri | A61K 9/127 977/907 |
| 2008/0107723 A1 * | 5/2008 | Perkins | A61K 31/7036 424/450 |
| 2010/0021531 A1 | 1/2010 | Yoshino et al. | |
| 2012/0141461 A1 | 6/2012 | Thannickal et al. | |
| 2013/0171127 A1 * | 7/2013 | Niitsu | A61K 31/07 424/94.67 |
| 2015/0150993 A1 * | 6/2015 | Kaplan | A61K 45/06 424/130.1 |
| 2015/0175956 A1 * | 6/2015 | Elhofy | A01N 1/0221 435/404 |
| 2017/0152563 A1 | 6/2017 | Spira et al. | |

FOREIGN PATENT DOCUMENTS

| | | | |
|---|---|---|---|
| CA | 2 282 236 | * | 9/1999 |
| CN | 1171047 | * | 1/1998 |
| CN | 103816118 A | | 5/2014 |
| CN | 105997854 A | | 10/2016 |
| CN | 106310220 A | | 1/2017 |
| KR | 2017-0107256 A | | 9/2017 |
| WO | WO-2011/153323 A2 | | 12/2011 |
| WO | WO-2014/015016 A1 | | 1/2014 |

OTHER PUBLICATIONS

Rudokas, Mindaugas et al. "Liposome Delivery Systems for Inhalation: A Critical Review Highlighting Formulation Issues and Anticancer Applications." Medical principles and practice : international journal of the Kuwait University, Health Science Centre vol. 2 (2016): 60-72. doi: 10.1159 (Year: 2016).*
Pickart, Loren et al. "GHK Peptide as a Natural Modulator of Multiple Cellular Pathways in Skin Regeneration." BioMed research international vol. 2015 (2015): 648108. doi: 10.1155/2015/648108 (Year: 2015).*
Deger, Yeter, et al. "Protective effect of α-tocopherol on oxidative stress in experimental pulmonary fibrosis in rats." Cell Biochemistry and Function: Cellular biochemistry and its modulation by active agents or disease 25.6 (2007): 633-637. (Year: 2007).*
Adrian et al., Effects of bioactive liposomes on cultured hepatic stellate cells and liver fibrosis in bile duct ligated rates, Chapter 4 (2006).
Angulo et al., Non-alcoholic Fatty Liver Disease, J. Gastroenterol. Hepatol., 17 Suppl: S186-90 (2002).
Brady et al., Polyenylphosphatidylcholine Inhibits PDGF-induced Proliferation in Rat Hepatic Stellate Cells, Biochem. Biophys. Res. Commun., 248(1):174-9 (1998).
Chakravarthy et al., Identification of a Physiologically Relevant Endogenous Ligand for PPARalpha in Liver, Cell, 138(3):476-88 (2009).
Chitturi et al., NASH and Insulin Resistance: Insulin Hypersecretion and Specific Association With the Insulin Resistance Syndrome, Hepatology, 35(2):373-9 (2002).

(Continued)

*Primary Examiner* — Frederick F Krass
(74) *Attorney, Agent, or Firm* — MARSHALL, GERSTEIN & BORUN LLP (57) ABSTRACT

The present disclosure relates, in general, to compositions comprising phosphatidylcholine and phosphatidylcholine derivatives, e.g., DLPC (1, 2-dilauroyl-sn-glycero-3-phosphocholine) or DPPC, for the treatment of fibrosis, including liver fibrosis and associated conditions such as fatty liver disease, non-alcoholic steatohepatitis (NASH) and cirrhosis, or lung fibrosis and conditions associated with lung fibrosis.

21 Claims, 3 Drawing Sheets

(56) References Cited

OTHER PUBLICATIONS

Contos et al., The Clinicopathologic Spectrum and Management of Nonalcoholic Fatty Liver Disease, Adv. Anat. Pathol., 9(1):37-51 (2002).

Day, Pathogenesis of Steatohepatitis, Best Pract Res Clin Gastroenterol., 16(5):663-78 (2002).

Galli et al., Vitamin E: Emerging Aspects and New Directions, Free Radic. Biol. Med., 102:16-36 (2017).

Hasegawa et al., Plasma Transforming Growth factor-beta1 Level and Efficacy of Alpha-Tocopherol in Patients With Non-Alcoholic Steatohepatitis: A Pilot Study, Aliment Pharamcol. Ther., 15(10):1667-72 (2001).

Hinz et al., The Myofibroblast: One Function, Multiple Origins, Am. J. Pathol., 170(6):1807-16 (2007).

International Application No. PCT/US2018/055521, International Search Report and Written Opinion, mailed Jan. 2, 2019.

Jakobsson et al., Potential Role of Thyroid Receptor beta Agonists in the Treatment of Hyperlipidemia, Drugs, 77(15):1613-21 (2017).

Lavine, Vitamin E Treatment of Nonalcoholic Steatohepatitis in Children: A Pilot Study, J. Pediatr., 136(6):734-8 (2000).

Leclercq et al., CYP2E1 and CYP4A as Microsomal Catalysts of Lipid Peroxides in Murine Nonalcoholic Steatohepatitis, J. Clin. Invest., 105(8):1067-75 (2000).

Lichtenberg et al., Liposomes: Preparation, Characterization, and Preservation, Methods Biochem Anal., 33:337-462 (1988).

Lieber et al., Attenuation of Alcohol-Induced Hepatic Fibrosis by Polyunsaturated Lecithin, Hepatology, 12(6):1390-8 (1990).

Lieber et al., Phosphatidylcholine Protects Against Fibrosis and Cirrhosis in the Baboon, Gastroenterology, 106(1):152-9 (1994).

Lieber et al., Polyenylphosphatidylcholine Decreases Alcohol-Induced Oxidative Stress in the Baboon, Alcohol Clin. Exp. Res., 21(2):375-9 (1997).

Musille et al., Antidiabetic phospholipid-nuclear receptor complex reveals the mechanism for phospholipid-driven gene regulation, Nature Structural & Molecular Biology, 19:532-537 (2012).

Navder et al., Dilinoleoylphosphatidylcholine Is Responsible for the Beneficial Effects of Polyenylphosphatidylcholine on Ethanol-Induced Mitochondrial Injury in Rats, Biochem. Biophys. Res. Commun., 291(4):1109-12 (2002).

Popov et al., Targeting Liver Fibrosis: Strategies for Development and Validation of Antifibrotic Therapies, Hepatology, 50(4):1294-306 (2009).

Robertson et al., Nonalcoholic Steatosis and Steatohepatitis. II. Cytochrome P-450 Enzymes and Oxidative Stress, Am. J. Physiol. Gastrointest. Liver Physiol., 281(5):G1135-9 (2001).

Sanyal et al., Mechanisms of Disease: Pathogenesis of Nonalcoholic Fatty Liver Disease, Nat. Clin. Pract Gastroenterol. Hepatol., 2(1):46-53 (2005).

Sanyal et al., Nonalcoholic Steatohepatitis: Association of Insulin Resistance and Mitochondrial Abnormalities, Gastroenterology, 120(5):1183-92 (2001).

Skelly et al., Findings on Liver Biopsy to Investigate Abnormal Liver Function Tests in the Absence of Diagnostic Serology, J. Hepatol., 35(2):195-9 (2001).

Thannickal et al., Mechanisms of Pulmonary Fibrosis, Annu. Rev. Med., 55:395-417 (2004).

Tomasek et al., Myofibroblasts and Mechano-Regulation of Connective Tissue Remodelling, Nat. Rev. Mol. Cell Biol., 3(5):349-63 (2002).

Trautwein et al., Hepatic Fibrosis: Concept to Treatment, J. Hepatol., 62(1 Suppl):S15-24 (2015).

Pickart et al., GHK peptide as a natural modulator of multiple cellular pathways in skin regeneration, Bio-Med Research International, vol. 2015, Article ID 648108, 7 pages (2015).

Extended Search Report for EP Application No. 18867017.8 dated Jun. 14, 2021.

Mebio, NASH (non-alcoholic steatohepatitis), vol. 26, No. 11, pp. 82-89 [2009].

Lee et al. A nuclear-receptor-dependent phosphatidylcholine pathway with antidiabetic effects. Nature. May 25, 2011;474(7352):506-10.

Q M Anstee 1, C P Day A lipid to treat non-alcoholic fatty liver disease—the dawn of 'lipo-rehabilitation'? J Hepatol. Apr. 2012;56(4):987-9.

Van Hoogevest et al., "The Use of Natural and Synthetic Phospholipids as Pharmaceutical Excipients", 2014, Eur. J. Lipid Sci. Technol., 116, Issue 9.

Meiners et al., Next-generation personalized drug discovery: the tripeptide GHK hits center stage in chronic obstructive pulmonary disease, Genome Med., vol. 4, Article No. 70 (2012).

Chiappini et al., Metabolism dysregulation induces a specific lipid signature of nonalcoholic steatohepatitis in patients, Sci Rep, 7(1): 46658-46674 (Apr. 2017).

EP Application No. 18867017.8, Examination Report, Dated Jul. 16, 2024.

\* cited by examiner

Normal Murine Liver    Six Weeks CCl4    Six Weeks CCl4 w/Liposome

Figure 3

COMPOSITIONS AND METHODS FOR TREATMENT OF FIBROSIS

CROSS REFERENCE TO RELATED APPLICATIONS

The present application claims the priority benefit of U.S. Provisional Patent Application No. 62/570,847, filed Oct. 11, 2017, incorporated herein by reference.

FIELD OF THE DISCLOSURE

The present disclosure relates, in general, to compositions comprising phosphatidylcholine derivatives, e.g., DLPC (1,2-dilauroyl-sn-glycero-3-phosphocholine) or DPPC, for the treatment of fibrosis, including liver fibrosis and associated conditions such as fatty liver disease, non-alcoholic steatohepatitis (NASH) and cirrhosis.

BACKGROUND

Fatty liver disease (FLD), both alcoholic (AFLD) and non-alcoholic (NAFLD), result in an unregulated lipid metabolism. There are many pathways driving FLD but three of the important pathways for disease progression are reactive oxygen species (ROS), sterol regulatory element-binding protein-1 (SREBP-1), and peroxisome proliferator-activated receptors (PPAR). Modulation of each of these pathways has shown some benefit in abrogating FLD. Blocking ROS using vitamin E has demonstrated positive effects in animal models and there are some positive data in human trials. Several candidate drugs are in development to block PPAR gamma for treatment of non-alcoholic steatohepatitis (NASH).

Agonists for liver receptor homolog 1 (LRH-1) positively regulate SREBP-1 in vivo. These include a 12-carbon free fatty acid attached to phosphocholine called 1,2-dilauroyl-sn-glycero-3-phosphocholine (DLPC) and/or a 16-carbon free fatty acid attached to phosphocholine called 1,2-dipalmitoyl-sn-glycero-3-phosphocholine (DPPC). Longer chain phosphatidylcholines that bind to PPAR alpha and LRH-1 in cells and tissues, e.g., fibrotic tissues, can be replaced by the shorter chain DLPC and DPPC species. In animal models, the feeding DLPC in chow has been shown to slow liver fibrosis (U.S. Pat. No. 5,284,835). DPPC can also bind PPAR alpha which in turn blocks PPAR gamma and can also prevent disease progression.

Fibrosis results from the formation or development of excess fibrous connective tissue in an organ or tissue as a reparative or reactive process and occurs in a variety of diverse tissues when this process is unregulated by impaired re-epithelialization (Tomasek et al. Nat Rev Mol Cell Biol 3, 349-363 (2002), Thannickal et al Annu Rev Med 55, 395-417 (2004), Hinz et al. Am J Pathol 170, 1807-1816 (2007)). See also US Patent Publication 20120141461.

SUMMARY OF THE DISCLOSURE

The disclosure provides a method to deliver phosphotidylcholines, such as 1,2-dilauroyl-sn-glycero-3-phosphocholine (DLPC), 1,2-dipalmitoyl-sn-glycero-3-phosphocholine (DPPC) and/or any version of a free-fatty acid combination that would activate LRH-1 and PPAR alpha to regulate fibrosis in the liver and other tissues. It is contemplated that the DLPC and/or DPPC as lipid moieties can be solubilized in either a liposome, a micelle or an emulsion that facilitates targeted delivery to tissues.

In various embodiments, the disclosure provides a method for treating fibrosis comprising administering to a subject in need thereof an effective amount of phosphatidylcholine (PC) in a liposome or nanoparticle to treat fibrosis.

The disclosure also provides a composition comprising the liposome or nanoparticle as described herein comprising phosphatidylcholine in an amount effective to treat fibrosis. In various embodiments, the disclosure provides a composition comprising a liposome as described herein for use in treating fibrosis.

In various embodiments, the phosphatidylcholine is polyene phosphatyidyl choline (DPPC) or a choline head with a phospholipid tail of 16 carbons. In various embodiments, the phosphatidylcholine is di-linoleoyl-phosphatidylcholine (DLPC) or a choline head and a phospholipid tail of 12 carbons. In various embodiments, the liposome or nanoparticle comprises a mixture of phosphatidylcholines, such as DPPC and/or DPLC, and/or phosphatidylcholines having choline heads with a phospholipid tail of 16 carbons or 12 carbons.

In various embodiments, the liposome or nanoparticle further comprises an antioxidant. In various embodiments, the antioxidant is a lipid soluble antioxidant. In various embodiments, the antioxidant is vitamin E. In various embodiments, the vitamin E is in the liposome at a concentration of from about 1-20 mg/ml, from about 2-10 mg/ml, from about 4-10 mg/ml, or from about 4-8 mg/ml.

Additional anti-oxidants are described further in the Detailed Description.

In various embodiments, the liposome or nanoparticle further comprises a factor that can stimulate new cell growth. In various embodiments, the liposome or nanoparticle further comprises a protein or peptide that can stimulate new cell growth. In various embodiments, the peptide is a GHK peptide that can stimulate new cell growth.

In various embodiments, the liposome further comprises a factor that can stimulate new cell growth and an antioxidant. In various embodiments, the factor that stimulates new cell growth is GHK peptide and the antioxidant is vitamin E. In various embodiments, the liposome or nanoparticle comprises GHK in combination with DLPC and/or DPPC alone, or in combination with vitamin E.

In various embodiments, the liposome or nanoparticle further comprises polyethylene glycol (PEG). In various embodiments, the PEG is in the liposome at a concentration of from about 2-20 mg/ml, from about 5-15 mg/ml, or from about 4-10 mg/ml.

It is contemplated that the phosphatidylcholines are in the liposome such that they are administered in a concentration of about 2 to 50 mg/kg, 5 to 40 mg/kg, 10 to 30 mg/kg, 15 to 25 mg/kg, or 5 to 20 mg/kg per dose. It is contemplated that the DLPC, DPPC and/or other phosphatidylcholines with carbon tails of 16 or 12 carbons are administered in a concentration of about 2 mg/kg, 5 mg/kg, 10 mg/kg, 15 mg/kg, 20 mg/kg, 25 mg/kg, 30 mg/kg, 35 mg/kg, 40 mg/kg, 45 mg/kg 75 mg/kg or 100 mg/kg. In various embodiments, the phosphatidylcholine (PC) is in the liposome or nanoparticle at a total PC concentration of from about 0.1-100 mg/ml, from about 1-80 mg/ml, from about 5-70 mg/ml, from about 10-60 mg/ml, from about 15-100 mg/ml, from about 15-50 mg/ml, from about 20-80 mg/ml, from about 20-70 mg/ml, from about 30-60 mg/ml, or from about 40-50 mg/ml. In various embodiments, the total PC concentration is about 15 mg/ml, 20 mg/ml, 25 mg/ml, 30 mg/ml, 35 mg/ml, 40 mg/ml, 45 mg/ml, 50 mg/ml, 55 mg/ml, 60 mg/ml, 70 mg/ml, 75 mg/ml, 80 mg/ml, 85 mg/ml, 90 mg/ml, 95 mg/ml or 100 mg/ml. In various embodiments, the total PC than can be delivered per single dose delivered IV is about 20,000 mg, 15,000 mg, 10,000 mg, 8000 mg, 6000 mg, 4000 mg, 3000 mg, 2000 mg, 1000 mg, 750 mg, 500 mg, 400 mg, 200 mg/ml, or 100 mg.

In various embodiments, the liposome or nanoparticle further comprises cholesterol. Cholesterol may be in liposome or nanoparticle in the range of about 1 to 20 mg/kg, about 2 to 15 mg/kg, or about 5 to 10 mg/kg. In various embodiments, the cholesterol is in the liposome or nanoparticle in the range of about 1-20 mg/ml, or about 2-15 mg/ml, or about 5-10 mg/ml, or about 1-5 mg/ml, or about 1-3 mg/ml, or about 0.5 to 5 mg/ml. In various embodiments, the cholesterol concentration is about 1.0 mg/ml, 1.5 mg/ml, 2 mg/ml, 2.5 mg/ml, 3.0 mg/ml, 3.5 mg/ml, 4.0 mg/ml, 5 mg/ml, 6.0 mg/ml, 7.0 mg/ml, 7.5 mg/ml, 8.0 mg/ml, 8.5 mg/ml, 9.0 mg/ml, 9.5 mg/ml 10.0 mg/ml, 11 mg/ml, 12 mg/ml, 13 mg/ml, 14 mg/ml, 15 mg/ml, 16 mg/ml, 17 mg/ml, 18 mg/ml, 19 mg/ml or 20 mg/ml.

In various embodiments, the liposome can have the following composition, based on % composition by weight DLPC 10-50%, DPPC 10-50%, Cholesterol 0-5%, vitamin E 5-20%, and optionally PEG 0-15%. It is contemplated that combinations of components within these ranges are useful for making the liposomes herein and are specifically provided by the disclosure. Liposome content can be measured by HPLC or other analytical technique used to determine chemical content of compositions. In various embodiments, the liposome or nanoparticle comprises total phosphatidylcholine (PC) at a concentration of 20-80% composition by weight in the liposome. In various embodiments, the a liposome or nanoparticle comprises total phosphatidylcholine (PC) at a concentration of 1 to 100 mg/ml in the liposome.

In various embodiments, the liposome is administered by injection (e.g., intravenous, subcutaneous), topically, orally, by depot, or by inhalation. In various embodiments, the topical administration is transdermal. In various embodiments, the liposome is administered intravenously.

In various embodiments, the subject is suffering from fibrosis or a disease or condition that is a precursor of or directly leads to an associated fibrosis. In various embodiments, the disease or condition is any fibrotic disease including but not limited to liver fibrotic diseases like non-alcoholic steatohepatitis (NASH), non-alcoholic fatty liver disease (NAFLD), alcoholic steatohepatitis, or lung fibrotic diseases like chronic obstructive pulmonary disease (COPD) or Interstitial pulmonary fibrosis.

In various embodiments, the administration ameliorates one or more symptoms of fibrosis, including but not limited to, liver fibrosis, fat content of liver, incidence of or progression of cirrhosis, incidence of hepatocellular carcinoma, increased hepatic aminotransferase levels, such as alanine aminotransferase (ALT) and aspartate aminotransferase (AST), increased serum ferritin, elevated levels of gamma-glutamyltransferase (gamma-GT), and elevated levels of plasma insulin, cholesterol and triglyceride.

In various embodiments, the liposome or nanoparticle is administered weekly, once every two weeks, once every three weeks, monthly, or once every two months. In various embodiments, the therapy is administered for at least 1 year, and can be administered for the life of the subject or patient.

In various embodiments, the subject is a mammal. In various embodiments, the subject is human. In various embodiments, the subject is an adult or an adolescent.

In various embodiments, the composition further comprises a pharmaceutically acceptable excipient, carrier or diluent.

It is understood that each feature or embodiment, or combination, described herein is a non-limiting, illustrative example of any of the aspects of the invention and, as such, is meant to be combinable with any other feature or embodiment, or combination, described herein. For example, where features are described with language such as "one embodiment", "some embodiments", "certain embodiments", "further embodiment", "specific exemplary embodiments", and/or "another embodiment", each of these types of embodiments is a non-limiting example of a feature that is intended to be combined with any other feature, or combination of features, described herein without having to list every possible combination. Such features or combinations of features apply to any of the aspects of the invention. Where examples of values falling within ranges are disclosed, any of these examples are contemplated as possible endpoints of a range, any and all numeric values between such endpoints are contemplated, and any and all combinations of upper and lower endpoints are envisioned.

DETAILED DESCRIPTION

The present disclosure provides a liposome for the treatment for fibrosis, including liver fibrosis and liver disease, including but not limited to cirrhosis, hepatitis, and non-alcoholic steatosis hepatitis (NASH). The liposome disclosed herein is taken up by the liver and reduces fibrosis and inflammation resulting from oxidative species and death of liver cells.

Unless otherwise defined, all technical and scientific terms used herein have the same meaning as commonly understood by one of ordinary skill in the art to which this invention belongs. The following references provide one of skill with a general definition of many of the terms used in this invention: Singleton et al., DICTIONARY OF MICROBIOLOGY AND MOLECULAR BIOLOGY (2d ed. 1994); THE CAMBRIDGE DICTIONARY OF SCIENCE AND TECHNOLOGY (Walker ed., 1988); THE GLOSSARY OF GENETICS, 5TH ED., R. Rieger et al. (eds.), Springer Verlag (1991); and Hale & Marham, THE HARPER COLLINS DICTIONARY OF BIOLOGY (1991).

Each publication, patent application, patent, and other reference cited herein is incorporated by reference in its entirety to the extent that it is not inconsistent with the present disclosure.

As used herein and in the appended claims, the singular forms "a," "and," and "the" include plural referents unless the context clearly dictates otherwise. Thus, for example, reference to "a derivative" includes a plurality of such derivatives and reference to "a subject" includes reference to one or more subjects and so forth.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

As used herein, "liposome" refers to a closed structure comprising an outer lipid bi- or multi-layer membrane surrounding an internal aqueous space. Liposomes may be multi-laminar or unilaminar. The liposome is contemplated to range in size from 5 to 10 μM in diameter to nanoparticle size. In certain embodiments, the liposome nanoparticle is from about 50 to 1000 nm, from about 100 nm to 600 nm, from about 200 to 600 nm, from about 200 to 500 nm, or from about 100 to 300 nm in diameter, or from about 100 to 200 nm in diameter. In various embodiments, the liposome or nanoparticle is about 200 nm in diameter.

As used herein a "micelle" refers to an approximately spherical lipid-based particle in aqueous solution wherein the forms an aggregate with the hydrophilic "head" regions of the lipid in contact with surrounding solvent, sequestering the hydrophobic single-tail regions in the center of the micelle. Micelles comprise a single lipid layer compared to a liposome which is a lipid bilayer.

As used herein an "emulsion" refers to a mixture of two or more liquids that are normally immiscible or unmixable in their natural state. In certain embodiments, the emulsion is an oil and water emulsion.

As used herein, a "therapeutically effective amount" or "effective amount" refers to that amount of the compound sufficient to result in amelioration of symptoms, for example, treatment, healing, prevention or amelioration of the relevant medical condition, or an increase in rate of treatment, healing, prevention or amelioration of such conditions, typically providing a statistically significant improvement in the treated patient population. When referencing an individual active ingredient, administered alone, a therapeutically effective dose refers to that ingredient alone. When referring to a combination, a therapeutically effective dose refers to combined amounts of the active ingredients that result in the therapeutic effect, whether administered in combination, including serially or simultaneously. In various embodiments, a therapeutically effective amount of the DLPC or DPPC liposome or particle ameliorates one or more symptoms of fibrosis, including but not limited to, liver fibrosis, fat content of liver, incidence of or progression of cirrhosis, incidence of hepatocellular carcinoma, increased hepatic aminotransferase levels, such as alanine aminotransferase (ALT) and aspartate aminotransferase (AST), increased serum ferritin, elevated levels of gamma-glutamyltransferase (gamma-GT), and elevated levels of plasma insulin, cholesterol and triglyceride.

As used herein "one or more symptom(s)", refers to common signs or indications that a patient is suffering from a specific condition or disease. For example, NAFLD-related symptoms contemplated herein include, but are not limited to, liver fibrosis, fat content of liver, increased hepatic aminotransferase levels, such as ALT and AST, increased serum ferritin, elevated levels of gamma-glutamyltransferase (gamma-GT), and elevated levels of plasma insulin, cholesterol and triglyceride. Pulmonary fibrosis-related symptoms contemplated herein include, but are not limited to, weakness and malaise, dry unexplained cough, shortness of breath, and diminished exercise tolerance. Liver fibrosis-related symptoms contemplated herein include, but are not limited to, yellowing of the skin (jaundice), fatigue, weakness, loss of appetite, itching, and bruising.

As used herein "subject" refers to a human or non-human animal, including a mammal or a primate, that is administered a liposome or nanoparticle as described herein. Subjects can include animals such as dogs, cats, rats, mice, rabbits, horses, pigs, sheep, cattle, and humans and other primates.

As used herein, the term "pharmaceutically acceptable" refers to those compounds, materials, compositions, and/or dosage forms that are, within the scope of sound medical judgment, suitable for contact with the tissues of human beings and animals without excessive toxicity, irritation, allergic response, or other problems or complications commensurate with a reasonable benefit/risk ratio. The term "pharmaceutically compatible ingredient" refers to a pharmaceutically acceptable diluent, adjuvant, excipient, or vehicle with which an antibody-drug conjugate is administered.

Liposomes

Liposomes have been used in pharmaceutical development for over a decade. Liposome preparation is described in U.S. Pat. No. 6,217,899; US Patent Publication No. 20100021531, Lichtenberg et al., Methods Biochem Anal. 33:337-462, 1988; and G. Gregoriadis: "Liposome Technology Liposome Preparation and Related Techniques," 2nd edition, Vol. I-III, CRC Press. Liposomes for pharmaceutical use have been disclosed in Mozafari, M., Liposomes, Methods and Protocols Vol. 1, Chapter 2, V. Wessing Ed. 2010, Humana Press).

Liposomes may be multi-laminar or unilaminar. The liposome is contemplated to range in size from 5 to 10 μM in diameter to nanoparticle size. In certain embodiments, the liposome nanoparticle is from about 50 to 1000 nm, from about 100 nm to 600 nm, from about 200 to 600 nm, from about 200 to 500 nm, or from about 100 to 200 nm in diameter. Liposome size can be measured using methods known in the art, including use of a Zetasizer (Malvern Instruments, United Kingdom), which measures particle size as the average diameter value of the entire particles by the dynamic light scattering method.

In various embodiments, the liposomes comprise lipids, and optionally sterols. In various embodiments, the liposomes comprise phosphatidylcholine derivatives, such as DLPC and DPPC, and optionally, cholesterol.

It is contemplated that the phosphatidylcholines are in the liposome such that they are administered in a concentration of about 2 to 50 mg/kg, 5 to 40 mg/kg, 10 to 30 mg/kg, 15 to 25 mg/kg or 5 to 20 mg/kg per dose. It is contemplated that the DLPC, DPPC and/or other phosphatidylcholines with carbon tails of 16 or 12 carbons are administered in a concentration of about 2 mg/kg, 5 mg/kg, 10 mg/kg, 15 mg/kg, 20 mg/kg, 25 mg/kg, 30 mg/kg, 35 mg/kg, 40 mg/kg, 45 mg/kg, 50 mg/kg, 75 mg/kg or 100 mg/kg. In various embodiments, the phosphatidylcholine (PC) is in the liposome or nanoparticle at a total PC concentration of from about 0.1-100 mg/ml, from about 1-80 mg/ml, from about 5-70 mg/ml, from about 10-60 mg/ml, from about 15-100 mg/ml, from about 15-50 mg/ml, from about 20-80 mg/ml, from about 20-70 mg/ml, from about 30-60 mg/ml, or from about 40-50 mg/ml. In various embodiments, the total PC concentration is about 15 mg/ml, 20 mg/ml, 25 mg/ml, 30 mg/ml, 35 mg/ml, 40 mg/ml, 45 mg/ml, 50 mg/ml, 55 mg/ml, 60 mg/ml, 70 mg/ml, 75 mg/ml, 80 mg/ml, 85 mg/ml, 90 mg/ml, 95 mg/ml or 100 mg/ml. In various embodiments, the total PC than can be delivered per single dose delivered IV is about 20,000 mg, 15,000 mg, 10,000 mg, 8000 mg, 6000 mg, 4000 mg, 3000 mg, 2000 mg, 1000 mg, 750 mg, 500 mg, 400 mg, 200 mg/ml, or 100 mg.

In various embodiments, the liposome or nanoparticle further comprises cholesterol. Cholesterol may be in liposome or nanoparticle in the range of about 1 to 20 mg/kg, about 2 to 15 mg/kg, or about 5 to 10 mg/kg. In various embodiments, the cholesterol is in the liposome or nanoparticle in the range of about 1-20 mg/ml, or about 2-15 mg/ml, or about 5-10 mg/ml, or about 1-5 mg/ml, or about 1-3 mg/ml or 0.5-5 mg/ml. In various embodiments, the cholesterol concentration is about 1.0 mg/ml, 1.5 mg/ml, 2 mg/ml, 2.5 mg/ml, 3.0 mg/ml, 3.5 mg/ml, 4.0 mg/ml, 5 mg/ml, 6.0 mg/ml, 7.0 mg/ml, 7.5 mg/ml, 8.0 mg/ml, 8.5 mg/ml, 9.0 mg/ml, 9.5 mg/ml 10.0 mg/ml, 11 mg/ml, 12 mg/ml, 13 mg/ml, 14 mg/ml, 15 mg/ml, 16 mg/ml, 17 mg/ml, 18 mg/ml, 19 mg/ml or 20 mg/ml.

Vitamin E is a lipid soluble moiety and has shown some efficacy as an antioxidant but the theory in the literature it is hypothesized Vitamin E would work better in combination with another approach. In various embodiments, the liposome comprises DLPC and or DPPC as a lipid solubilized mixture with vitamin E or any other antioxidant.

Exemplary antioxidants include, but are not limited to, tocopherols, tocotrienols, alpha-tocopherol, beta-tocopherol, gamma-tocopherol, delta-tocopherol, alpha-tocotrienol, beta-tocotrienol, alpha-tocopherolquinone, Trolox (6-hydroxy-2,5,7,8-tetramethylchroman-2-carboxylic acid), butylated hydroxyanisole (BHA), butylated hydroxytoluene (BHT), flavonoids, isoflavones, lycopene, beta-carotene, selenium, ubiquinone, luetin, S-adenosylmethionine, gluta-thione, taurine, N-acetylcysteine, citric acid, L-carnitine, BHT, monothioglycerol, ascorbic acid, propyl gallate, methionine, cysteine, homocysteine, gluthatione, cystamine and cysstathionine, and glycine-glycine-histidine (tripeptide). In various embodiments, the anti-oxidant is a lipid soluble anti-oxidant.

In various embodiments, the concentration of vitamin E in the liposome is from about 1-20 mg/ml, from about 5-25 mg/ml, from about 10-15 mg/ml or from about 2-10 mg/ml, from about 4-10 mg/ml, or from about 4-8 mg/ml.

Another approach to restore liver function can be to stimulate new cell growth. Lipid particles or liposomes can be carriers for aqueous solutions. One growth hormone called liver growth peptide, GHK, can stimulate liver stem cell growth and is also a potent anti-oxidant. In various embodiments, the liposome is useful to deliver stem cell growth factors to tissues, such as liver. In various embodiments, the growth factor is a hepatic growth factor. In various embodiments, the stem cell growth factor is a protein or a peptide. In various embodiments, the peptide is the GHK peptide. In various embodiments, the stem cell growth factor is enclosed within the liposome, micelle or emulsion.

In various embodiments, it is contemplated that the liposome is anti-fibrotic and/or comprises an anti-fibrotic agent. In various embodiments, the anti-fibrotic agent is lipid soluble. Anti-fibrotic agents contemplated for use herein are described in greater detail below.

Additionally the liposomes may comprises stabilizers or other inactive ingredients, including, but not limited to, polyethylene glycol, PLGA, detergents, and/or surfactants. In various embodiments, PEG is in the liposome at a concentration of from about 2-20 mg/ml, from about 5-15 mg/ml, or from about 4-10 mg/ml.

In various embodiments, the liposome can have the following composition, based on % composition by weight DLPC 10-50%, DPPC 10-50%, Cholesterol 0-5%, vitamin E or other antioxidant 5-20%, and optionally PEG 0-15%. It is contemplated that combinations of components within these ranges are useful for making the liposomes herein and are specifically provided by the disclosure. Liposome content can be measured by HPLC or other analytical technique used to determine chemical content of compositions.

Methods of Use

It is contemplated that the liposomes disclosed herein are useful to treat fibrosis and conditions that have associated fibrosis or pre-fibrotic conditions such as fatty liver disease, NASH or other related diseases. Previous studies have described that soy lecithin extract, containing primarily species of polyenylphosphatidylcholine (PPC) prevents alcohol-induced cirrhosis in baboons (Leiber et al., Gastroenterology 106:152-159, 1994). Baboons were fed the lecithin extract directly with their food. It is hypothesized that the DLPC liposome herein is targeted to the liver or other tissue due to the DLPC or DPPC binding to LRH-1 and/or PPAR alpha.

DLPC, DPPC and vitamin E have been previously identified as agents with possible therapeutic application in NASH. Clinical trials evaluating oral supplementation of vitamin E in NASH have been completed (Galli et al., *Free Radical Biology and Medicine* 2017; 102: 16-36). Both DLPC and DPPC have been evaluated alone and in combination with other phospholipids in pre-clinical animal models of liver fibrosis (primate and rodent and baboon). See, e.g., Brady et al., *Biochem Biophys Res Com* 1998; 248: 174-179; Navder et al., *Biochem Biophys Res Com* 2002; 291: 1109-1112; Lieber et al., *Hepatology* 1990; 12: 1390-98; Lieber et al., *Alcohol Clin Exp Res* 1997: 21: 375-379; Musille et al. *Nat Struct Mol Biol;* 19: 532-S2, and Chakravarthy et al., *Cell* 2009; 138: 476-488.

The animal studies of DLPC have demonstrated that DLPC has the ability to mitigate inflammatory processes leading to liver fibrosis by binding to and modulating the action of an intracellular receptor known to play a pivotal role in fibrosis: liver receptor homologue-1 (LRH-1) (Musille et al., supra) In these preclinical studies, DLPC has been given orally with chow. DLPC was also previously studied in a clinical trial in humans using an oral route of administration. In this study, DLPC was found to have no significant clinical effect presumably due to low oral bioavailability.

Alpha-tocopherol (vitamin E) is fat soluble vitamin that is a chain breaking antioxidant that terminates free radical-dependent peroxidative reactions. Specifically, vitamin E has been shown to prevent peroxidative reactions of polyunsaturated lipids in hepatocyte membranes. Vitamin E has been shown to be cytoprotective in models of hepatic fibrosis and more recently, has been studied in several randomized trials in patients with Non-alcoholic fatty liver disease (NAFLD) and NASH. The trials have shown that patients with biopsy proven NASH may benefit from oral vitamin E supplementation, with such patients in the vitamin E trials demonstrating improvement in hepatic steatosis and lobular inflammation but not portal inflammation or fibrosis. Current guidelines from the American Association for the Study of Liver Disease recommend vitamin E supplementation as first line therapy for treatment of patients with biopsy proven NASH (Galli et al., supra).

In various embodiments, the subject is suffering from fibrosis or a disease or condition that leads to or is an associated fibrosis. In various embodiments, the disease or condition is non-alcoholic steatohepatitis (NASH), non-alcoholic fatty liver disease (NAFLD), alcoholic steatohepatitis, hepatitis, liver cirrhosis, lung fibrosis, chronic obstructive pulmonary disease (COPD), or interstitial pulmonary fibrosis.

Non-alcoholic fatty liver disease (NAFLD) represents a spectrum of disease occurring in the absence of alcohol abuse. It is characterized by the presence of steatosis (fat in the liver) and may represent a hepatic manifestation of the metabolic syndrome (including obesity, diabetes and hypertriglyceridemia). NAFLD is linked to insulin resistance, it causes liver disease in adults and children and may ultimately lead to cirrhosis (Skelly et al., J Hepatol 2001; 35: 195-9; Chitturi et al., Hepatology 2002; 35(2):373-9). The severity of NAFLD ranges from the relatively benign isolated predominantly macrovesicular steatosis (i.e., nonalcoholic fatty liver or NAFL) to non-alcoholic steatohepatitis (NASH) (Angulo et al., J Gastroenterol Hepatol 2002; 17 Suppl:S186-90). NASH is characterized by the histologic presence of steatosis, cytological ballooning, scattered inflammation and pericellular fibrosis (Contos et al., Adv Anat Pathol 2002; 9:37-51). Hepatic fibrosis resulting from NASH may progress to cirrhosis of the liver or liver failure, and in some instances may lead to hepatocellular carcinoma.

The mechanism by which NAFLD develops into NASH remains unclear. Because insulin resistance is associated with both NAFLD and NASH, it is postulated that other additional factors are also required for NASH to arise. This is referred to as the "two-hit" hypothesis (Day C P., Best Pract Res Clin Gastroenterol 2002; 16(5):663-78) and involves an accumulation of fat within the liver and the presence of large amounts of free radicals with increased oxidative stress. Macrovesicular steatosis represents hepatic accumulation of triglycerides, and this in turn is due to an imbalance between the delivery and utilization of free fatty acids to the liver. During periods of increased calorie intake, triglyceride will accumulate and act as a reserve energy source. When dietary calories are insufficient, stored triglycerides (in adipose) undergo lipolysis and fatty acids are released into the circulation and are taken up by the liver. Oxidation of fatty acids will yield energy for utilization.

Treatment of NASH currently revolves around the reduction of the two main pathogenic factors, namely, fat accumulation within the liver and excessive accumulation of free radicals causing oxidative stress. Reduction of oxidative stress through treatment with antioxidants has been shown to be effective in some studies. For example, obese children who had steatosis were treated with vitamin E (400-1000 IU/day) for 4-10 months (Lavine J Pediatr 2000; 136(6): 734-8). Despite any significant change in BMI, the mean ALT levels decreased from 175.+−.106 IU/L to 40.+−.26 IU/L (P<0.01) and mean AST levels decreased from 104.+− .61 IU/L to 33.+−.11 IU/L (P<0.002). Hepatic transaminases increased in those patients who elected to discontinue vitamin E therapy. An adult study using vitamin E for one year demonstrated similar reduction of hepatic transaminases as well as the fibrosis marker TGFβ levels (Hasegawa et al., Aliment Pharmacol Ther 2001; 15(10):1667-72). However, not all treatments with ROS scavengers have been effective.

Steatosis also may develop into steatohepatitis through oxidative stress due to reactive oxygen species (ROS) and decreased anti-oxidant defense (Sanyal et al., Gastroenterology 2001; 120(5):1183-92). ROS can be generated in the liver through several pathways involving mitochondrial oxidation, peroxisomes, cytochrome P450, NADPH oxidase and lipooxygenase (Sanyal et al., Nat Clin Pract Gastroenterol Hepatol 2005; 2(1):46-53). Insulin resistance and hyperinsulinism has been shown to increase hepatic oxidative stress and lipid peroxidation through increased hepatic CYP2EI activity (Robertson et al., Am J Physiol Gastrointest Liver Physiol 2001; 281(5):G1135-9; Leclercq et al., J Clin Invest 2000; 105(8):1067-75).

NAFLD may be differentiated from NASH by the NAFLD Activity Score (NAS), the sum of the histopathology scores of a liver biopsy for steatosis (0 to 3), lobular inflammation (0 to 2), and hepatocellular ballooning (0 to 2). A NAS of <3 corresponds to NAFLD, 3-4 corresponds to borderline NASH, and corresponds to NASH. The biopsy is also scored for fibrosis (0 to 4).

Fibrosis may also be measured by non-invasive methods using magnetic resonance elastography (MRE) and FIBROSCAN® ultrasound/transient elastography.

In various embodiments, the administration slows the progression of or reduces incidence of steatosis, lobular inflammation, portal inflammation and/or hepatocellular ballooning in subjects with NASH.

Fibrosis is a pathologic process that occurs when the body's natural healing process goes awry, leading to over production of extracellular matrix (ECM) and scar formation in response to tissue damage. Fibrosis formation involves the interaction between many cell types and cytokines, and when the balance becomes profibrotic, there is fibrosis formation. In some embodiments, the fibrosis is fibrosis of the lung, heart, blood vessel, liver, gallbladder, kidney, skin, lung, muscle, pancreas, eye, adrenal gland, thyroid, or other organs of the body. The causes of some fibrotic diseases are currently unknown or poorly understood. Fibrosis is typically considered to be an irreversible process.

Chronic pulmonary fibrosis results from scarring throughout the lungs which can be caused by many conditions including chronic inflammatory processes (sarcoidosis, Wegener's granulomatosis), infections, environmental agents (asbestos, silica, exposure to certain gases), exposure to ionizing radiation (such as radiation therapy to treat tumors of the chest), chronic conditions (lupus, rheumatoid arthritis), and even certain medications. In a condition known as hypersensitivity pneumonitis, fibrosis of the lung can develop following a heightened immune reaction to inhaled organic dusts or occupational chemicals. This condition most often results from inhaling dust contaminated with bacterial, fungal, or animal products. Currently, there are limited treatment options for fibrosing diseases. It is standard clinical practice to give patients prednisone and azathioprine but there is no data showing that these drugs provide any therapeutic benefit.

Additional fibrotic disorders include, chronic obstructive pulmonary disease, hepatic fibrosis, rheumatoid arthritis, congestive heart failure, chronic renal disease, hypersensitivity pneumonitis, respiratory bronchiolitis/interstitial lung disease, *Schistosoma mansoni* infection, primary pulmonary hypertension (prevention of the formation of the plexiform lesion) herpes virus associated-diseases, which include lung and dermatological manifestations; keloid scarring, lupus, nephrogenic fibrosing dermopathy, fibrosing lesions associated with *Schistosoma japonicum* infection, autoimmune diseases, pathogenic fibrosis, Lyme disease, stromal remodeling in pancreatitis and stromal fibrosis, uterine fibroids, ovarian fibrosis, corneal fibrosis congestive heart failure and other post-ischemic conditions, post-surgical scarring including abdominal adhesions, wide angle glaucoma trabeculotomy, and any combinations thereof, or scarring resulting from drug or radiation therapy.

In various embodiments, the administration improves one or more symptom of a fibrotic disease described herein including, but not limited to, liver fibrosis, fat content of liver, increased hepatic aminotransferase levels, such as ALT and AST, increased serum ferritin, elevated levels of gamma-glutamyltransferase (gamma-GT), and elevated levels of plasma insulin, cholesterol and triglyceride, dry unexplained cough, shortness of breath, diminished exercise tolerance, yellowing of the skin (jaundice), fatigue, weakness, loss of appetite, itching, and bruising.

It is further contemplated that the lipid particle composition is administered with a second agent useful for treating NASH or other aspects of fibrosis. A second agent may be other therapeutic agents, such as anti-diabetic agents, cytokines, growth factors, other anti-inflammatory agents, anticoagulant agents, agents that will lower or reduce blood pressure, agents that will reduce cholesterol, triglycerides, LDL, VLDL, or lipoprotein(a) or increase HDL, agents that will increase or decrease levels of cholesterol-regulating proteins, anti-neoplastic drugs or molecules.

Exemplary second agents include, but are not limited to, agents used to treat NASH or diabetes, cyclophosphamide, either alone or in combination with mycophenolate mofetil (MMF) or prednisolone, or other corticosteroids, anti-inflammatory agents, azathioprine, or anti-fibrotic agents.

Exemplary anti-diabetic agents include, but are not limited to, sulfonylureas (e.g., glimepiride, glisentide, sulfonylurea, AY31637); biguanides (e.g., metformin); alpha-glucosidase inhibitors (e.g., acarbose, miglitol); thiazolidinediones (e.g., troglitazone, pioglitazone, rosiglitazone, glipizide, balaglitazone, rivoglitazone, netoglitazone, troglitazone, englitazone, AD 5075, T 174, YM 268, R 102380, NC 2100, NIP 223, NIP 221, MK 0767, ciglitazone, adaglitazone, CLX 0921, darglitazone, CP 92768, BM 152054); glucagon-like-peptides (GLP) and GLP analogs or agonists of GLP-1 receptor (e.g., exendin) or stabilizers thereof (e.g., DPP4 inhibitors, such as sitagliptin); insulin or analogues or mimetics thereof (e.g., LANTUS), or Thyroid hormone receptor beta agonists (Sobetirome, Eprotirome, MB07811 (2R, 4S)-4-(3-chlorophenyl)-2-[(3,5-dimethyl-4-(4'-hydroxy-3'-isopropylbenzyl)phenoxy) methyl]-2-oxido-[1-3]-dioxaphosphonane, MGL3196 2-[3,5-Dichloro-4-(5-isopropyl-6-oxo-1,6-dihydropyridazin-3-yloxy)phenyl]-3,5-dioxo-2,3,4,5-tetrahydro[1, 2, 4]triazine-6-carbonitrile, see Jakobsson et al., Drugs. 2017; 77(15): 1613-1621).

Anti-fibrotic agents contemplated for use in the methods of the present disclosure can be any agent that affects fibrosis. Contemplated agents include, but are not limited to, those that reduce the activity of transforming growth factor-beta (TGF-β) (including but not limited to GC-1008 (Genzyme/Medlmmune); lerdelimumab (CAT-152; Trabio, Cambridge Antibody); metelimumab (CAT-192, Cambridge Antibody,); LY-2157299 (Eli Lilly); ACU-HTR-028 (Opko Health)) including antibodies that target one or more TGF-β isoforms, inhibitors of TGF-β receptor kinases TGFBR1 (ALKS) and TGFBR2, and modulators of post-receptor signaling pathways; chemokine receptor signaling; endothelin receptor antagonists including inhibitors that target both endothelin receptor A and B and those that selectively target endothelin receptor A (including but not limited to ambrisentan; avosentan; bosentan; clazosentan; darusentan; BQ-153; FR-139317, L-744453; macitentan; PD-145065; PD-156252; PD163610; PS-433540; S-0139; sitaxentan sodium; TBC-3711; zibotentan); agents that reduce the activity of connective tissue growth factor (CTGF) (including but not limited to FG-3019, FibroGen), and also including other CTGF-neutralizing antibodies; matrix metalloproteinase (MMP) inhibitors (including but not limited to MMPI-12, PUP-1 and tigapotide triflutate); agents that reduce the activity of epidermal growth factor receptor (EGFR) including but not limed to erlotinib, gefitinib, BMS-690514, cetuximab, antibodies targeting EGF receptor, inhibitors of EGF receptor kinase, and modulators of post-receptor signaling pathways; agents that reduce the activity of platelet derived growth factor (PDGF) (including but not limited to Imatinib mesylate (Novartis)) and also including PDGF neutralizing antibodies, antibodies targeting PDGF receptor (PDGFR), inhibitors of PDGFR kinase activity, and post-receptor signaling pathways; agents that reduce the activity of vascular endothelial growth factor (VEGF) (including but not limited to axitinib, bevacizumab, BIBF-1120, CDP-791, CT-322, IMC-18F1, PTC-299, and ramucirumab) and also including VEGF-neutralizing antibodies, antibodies targeting the VEGF receptor 1 (VEGFR1, Flt-1) and VEGF receptor 2 (VEGFR2, KDR), the soluble form of VEGFR1 (sFlt) and derivatives thereof which neutralize VEGF, and inhibitors of VEGF receptor kinase activity; inhibitors of multiple receptor kinases such as BIBF-1120 which inhibits receptor kinases for vascular endothelial growth factor, fibroblast growth factor, and platelet derived growth factor; agents that interfere with integrin function (including but not limited to STX-100 and IMGN-388) and also including integrin targeted antibodies; agents that interfere with the pro-fibrotic activities of IL-4 (including but not limited to AER-001, AMG-317, APG-201, and sIL-4Rα) and IL-13 (including but not limited to AER-001, AMG-317, anrukinzumab, CAT-354, cintredekin besudotox, MK-6105, QAX-576, SB-313, SL-102, and TNX-650) and also including neutralizing anti-bodies to either cytokine, antibodies that target IL-4 receptor or IL-13 receptor, the soluble form of IL-4 receptor or derivatives thereof that is reported to bind and neutralize both IL-4 and IL-13, chimeric proteins including all or part of IL-13 and a toxin particularly *pseudomonas* endotoxin, signaling though the JAK-STAT kinase pathway; agents that interfere with epithelial mesenchymal transition including inhibitors of mTor (including but not limited to AP-23573); agents that reduce levels of copper such as tetrathiomolybdate; agents that reduce oxidative stress including N-acetyl cysteine and tetrathiomolybdate; and interferon gamma. Also contemplated are agents that are inhibitors of phosphodiesterase 4 (PDE4) (including but not limited to Roflumilast); inhibitors of phosphodiesterase 5 (PDE5) (including but not limited to mirodenafil, PF-4480682, sildenafil citrate, SLx-2101, tadalafil, udenafil, UK-369003, vardenafil, and zaprinast); or modifiers of the arachidonic acid pathway including cyclooxygenase and 5-lipoxegenase inhibitors (including but not limited to Zileuton). Further contemplated are compounds that reduce tissue remodeling or fibrosis including prolyl hydrolase inhibitors (including but not limited to 1016548, CG-0089, FG-2216, FG-4497, FG-5615, FG-6513, fibrostatin A (Takeda), Iufironil, P-1894B, and safironil) and peroxisome proliferator-activated receptor (PPAR)-gamma agonists. (including but not limited to pioglitazone and rosiglitazone).

Other specific anti-fibrotic agents contemplated include relaxin, pirfenidone, ufironil, surifonil, a TGF-β antibody, CAT-192, CAT-158; ambresentan, thelin; FG-3019, a CTGF antibody; anti-EGFR antibody; a EGFR kinase inhibitor; tarceva; gefitinib; PDGF antibody, PDGFR kinase inhibitor; gleevec; BIBF-1120, VEGF, FGF, and PDGF receptor inhibitor; anti-integrin antibody; IL-4 antibody; tetrathiomolybdate, a copper chelating agent; interferon-gamma; NAC, a cysteine pro-drug; hepatocyte growth factor (HGF); KGF; angiotension receptor blockers, ACE inhibitors, rennin inhibitors; COX and LO inhibitors; Zileuton; monteleukast; avastin; statins; PDE5 inhibitors, such as sildenafil, udenafil, tadalafil, vardenafil, or zaprinast; rofumilast; etanercept (Enbrel); procoagulant; prostaglandins, such as PGE2, PRX-08066, a 5HT2B receptor antagonist; cintredekin besudotox, a chimeric human IL13 conjugated to a genetically engineered *Pseudomonas* exotoxin; roflumilast, a PDE4 inhibitor; FG-3019, an anti-connective tissue growth factor human monoclonal antibody; GC-1008, a TGF-β human monoclonal antibody; treprostinil, a prostacyclin analog; interferon-α; QAX-576, a IL13 modulator; WEB 2086, a PAF-receptor antagonist; imatinib mesylate; FG-1019; Suramin; Bosentan; IFN-1b; anti-IL-4; anti-IL-13; taurine, niacin, NF-κB antisense oligonucleotides; and nitric oxide synthase inhibitors.

Lipid particles, e.g., liposomes, micelles or emulsions, contemplated herein may be administered by several routes such as parenteral, topical, intranasal, inhalational or oral administration. In one embodiment, the compositions are suitable for parenteral, e.g., intravenous, administration. In one embodiment, the compositions are suitable for topical administration, e.g., by transdermal patch. The lipid particles may also be administered via a drug depot.

Manufacture

Also provided is a method of making a liposome or nanoparticle as described herein.

In various embodiments, the liposomes are manufactured from natural mixtures of phosphatidylcholines or from purified synthetic phosphatidylcholines. Liposomes may be manufactured by a commercial laboratory. In certain methods, liposomes are manufactured by a version of microfluidic ethanol injection and allows for optimal control of liposome manufacturing. For example, the process may be a single step, aseptic process. Liposome size is adjusted by modulating the process parameters during vesicle formation. A closed system is used for production. All components can be added via sterile filtration. Subsequent concentration by crossflow filtration is possible as well.

The method provides homogeneous, uniform vesicles with good batch to batch consistency.

All components used in the manufacturing process are tested to determine purity and analytical tests such as endotoxin, pH, visual inspection, and the like, are carried out to confirm quality control. These include using HPLC to determine the amounts of each phospholipid in the wall of the liposome.

Formulations

Various delivery systems can be used to administer liposomes or nanoparticles of the disclosure. In various embodiments of the present disclosure, administration of the liposome composition is by intravenous infusion. In some embodiments, administration is by a 30 minute, 1 hour or two hour intravenous infusion.

The liposome composition can be administered as a pharmaceutical composition comprising one or more pharmaceutically compatible ingredients. For example, the pharmaceutical composition typically includes one or more pharmaceutically acceptable carriers, for example, water-based carriers (e.g., sterile liquids).

The composition, if desired, can also contain, for example, saline salts, buffers, salts, nonionic detergents, and/or sugars. Examples of suitable pharmaceutical carriers are described in "Remington's Pharmaceutical Sciences" by E. W. Martin.

The present disclosure provides, for example, pharmaceutical compositions comprising a therapeutically effective amount of the liposome or nanoparticle, a buffering agent, optionally a cryoprotectant, optionally a bulking agent, optionally a salt, and optionally a surfactant. Additional agents can be added to the composition. A single agent can serve multiple functions. For example, a sugar, such as trehalose, can act as both a cryoprotectant and a bulking agent. Any suitable pharmaceutically acceptable buffering agents, surfactants, cyroprotectants and bulking agents can be used in accordance with the present disclosure.

The formulations of the present disclosure can be used with the methods described herein or with other methods for treating disease.

Kits

As an additional aspect, the disclosure includes kits which comprise one or more liposome or nanoparticle compounds or compositions packaged in a manner which facilitates their use to practice methods of the disclosure. In one embodiment, such a kit includes a compound or composition described herein (e.g., a composition comprising a liposome or nanoparticle, either alone or in combination with an anti-fibrotic agent), packaged in a container such as a sealed bottle or vessel, with a label affixed to the container or included in the package that describes use of the compound or composition in practicing the method. Preferably, the compound or composition is packaged in a unit dosage form. The kit may further include a device suitable for administering the composition according to a specific route of administration or for practicing a screening assay. Preferably, the kit contains a label that describes use of the liposome or nanoparticle compositions.

Additional aspects and details of the present serum replacement will be apparent from the following examples, which are intended to be illustrative rather than limiting.

EXAMPLES

Example 1—Liposomes Comprising Phosphatidylcholine Reduce Liver Fibrosis in Mice There are several mouse models for liver disease, however, no single model mimics human liver disease perfectly. Fed animals models alter the diets of subject animals, e.g., by feeding a high fat diet or alcohol or, which over time lead to cirrhotic livers. Liver toxicity animals models, such as carbon tetrachloride ($CCl_4$), cause liver damage due to toxic effects of the administered agent and result in fibrosis (Trautwein et al., J Hepatology 62:S15-S24, 2015; Popov and Schuppan, Hepatology 50:1294-1305, 2009). There are also genetic animal models that simulate NASH when combined with diet. In any of the mouse models, measuring fibrosis and or lipid dis-regulation are indicators of disease. The use of the current therapy will reduce fibrosis and decrease liver enzymes.

Rat and rabbit models for NASH also exist. Both of these animal models utilize a feeding method to induce liver disease. In the fed models the animals gain weight due to the high fat diet and exhibit fibrosis and elevated liver enzymes. The present liposome therapy will decrease fibrosis and decrease liver enzymes in these animals.

Materials and Methods:

Animal Information: BALB/C male mice were maintained on fed water and a standard rodent diet (Harlan irradiated 2918) consisting of 18% protein, 5% fat, and 5% fiber ad libitum. Micro and macro-environmental factors such as ventilation, temperature and humidity are recorded daily by vivarium staff and tracked in their documentation. Animals were dosed with vehicle control or liposome, starting two weeks after $CCl_4$ treatment. Experiment was terminated within 24 hours after 28 days of dosing.

CCl$_4$ Injury: Corn or Olive oil formulated carbon tetrachloride (0014) was administered 0.5 µl/g of a 20% solution 2-3 times per week for 6 weeks to induce liver fibrosis.

Liposome: The liposome was made using ethanol drop method commonly used in the art. Briefly, a mixture of DPPC and DLPC was admixed with ethanol dropwise to induce liposome formation. The liposome consisted of phophatidylcholines and vitamin E. Optionally, the liposome may comprise 5/mg/kg cholesterol.

Therapeutic administration: After 2 weeks of CCl$_4$ administration to induce fibrosis, mice are divided into treatment groups, n=8/group, with control animals receiving no therapy, CCl$_4$+saline, Treatment Group I receiving liposome therapy 2×/week intraperitoneally (ip), and Treatment Group II receiving liposome therapy 3×/week ip. Mice received 10 mg/kg liposome (having 5 mg/kg DPPC and 5 mg/kg DLPC) per dose, for a total of 20 mg/kg/week or 30 mg/kg/week.

Study termination: On completing 4 weeks of dosing mice were euthanized using the CO$_2$ inhalation method. Liver was isolated, weighed and cut into 4 large sections 200-300 mg each and 2 smaller sections 50-100 mg each. The large lobe was formalin fixed and smaller sections snap frozen for analysis.

Blood collection: At study initiation, n=4/24 (study baseline) blood was collected by saphenous or submandibular venipuncture technique. (Expected serum volume 30-50 µl). Terminal blood collected by cardiac puncture Biomarker assays and tissue scoring: Levels of ALT and AST enzymes were measured in serum from animals. Liver samples (Formalin fixed tissue blocks), were processed for H&E, Picrosirius red staining and then scored for fibrosis pathology.

Results

Figure 1:
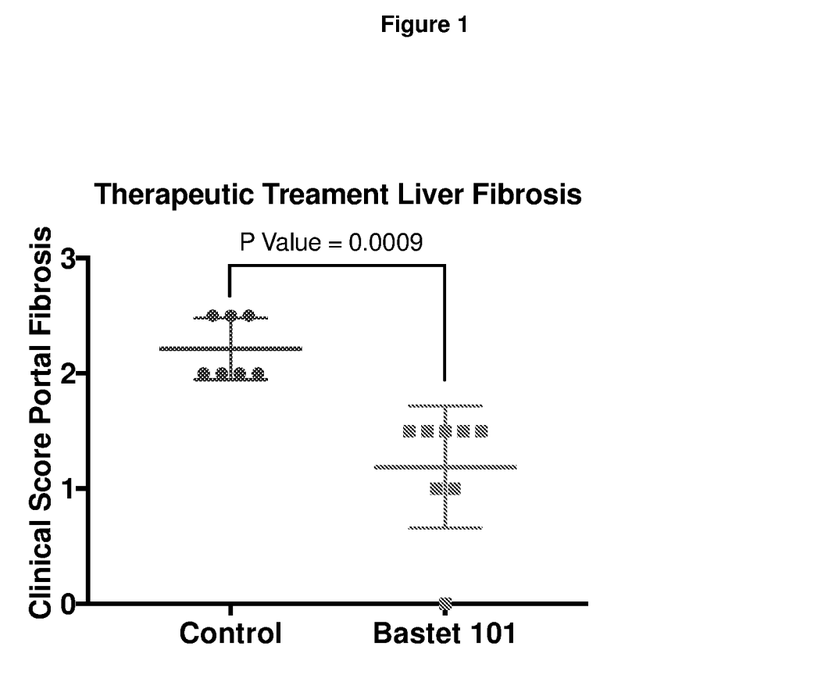
FIG. 1 shows the reduction of fibrosis pathology in mice treated with liposomes comprising phosphatidylcholines.
Figure 2:
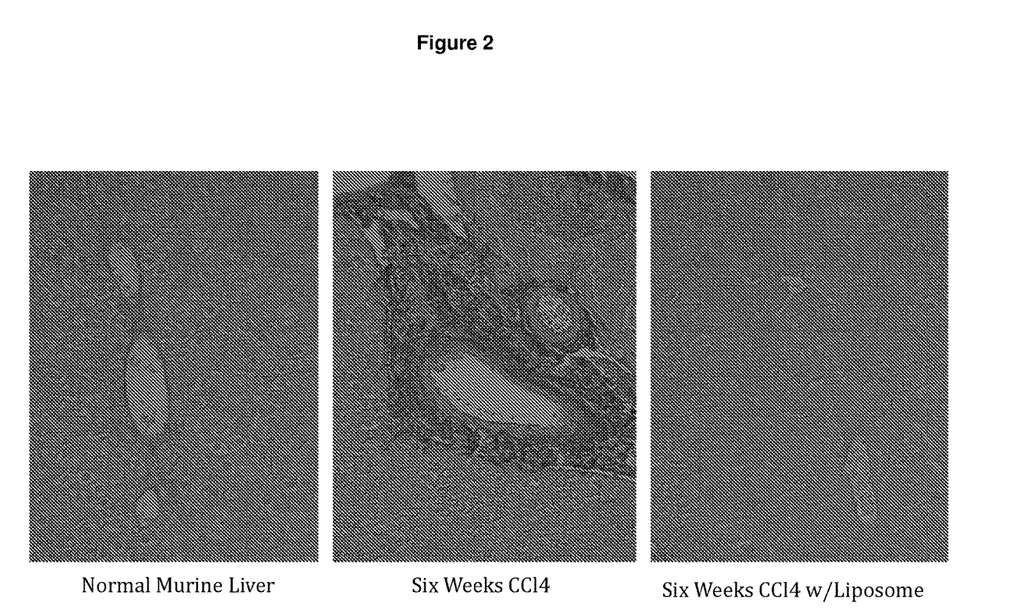
FIG. 2 provides representative liver histology from the control and liposome treatment groups.
Figure 3:
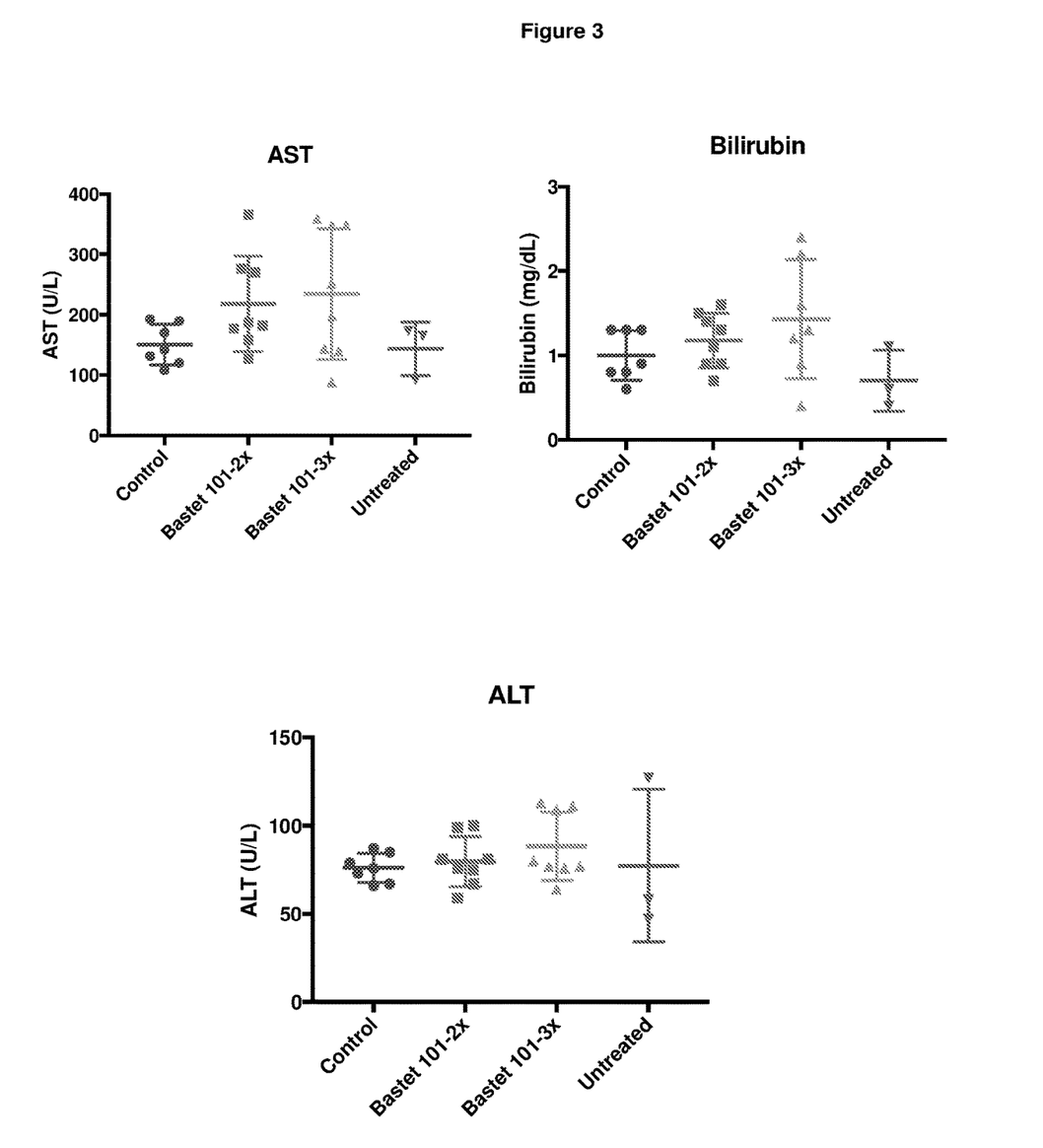
FIG. 3 shows that there is no significant change in liver enzymes levels (ALT, AST and bilirubin) between control and treatment groups.

Analysis of the pathology score for treated and untreated CCl$_4$ animals showed that administration of the liposome (Bastet101) comprising DLPC reduced the severity of fibrosis therapeutically in treated animals (FIG. 1). Untreated animals showed an average histology score of approximately 2 whereas the liposome-treated animals has an average pathology score of approximately 1.5, showing a statistically significant difference between the treated and untreated group (p value 0.0009). FIG. 2 shows a representative histological slide of the Sirius red (staining specific for collagen deposition in fibrosis) in control or treated liver tissue. Treatment with the present liposome was noted to prevent CCL4 induced hepatic fibrosis while not causing any liver toxicity as seen by the levels of ALT, AST, and total bilirubin in the control and treated animals (FIG. 3).

Example 2—Therapeutic Use in Human Subjects with NAFLD or Liver Fibrosis

The present liposome therapy is designed for human use. The therapy is useful for people with liver disease including but not limited to NASH and alcoholic cirrhosis. The disease markers are similar for both with increase fibrosis, stiffening of the liver as measured by Fibroscan. Liver biopsy is also used to diagnose liver disease.

To assess safety and tolerability of the liposomes, subjects receiving therapy are greater than 18 years with biopsy proven non-alcoholic steatohepatitis (NASH) with histopathologic NASH stage greater than or equal to a fibrosis score of >1 but <3. Subject will be divided into groups as follows: 1) subjects will receive placebo infusion of 130 mLs of 5% dextrose every 4 weeks. 2) subjects will receive an IV infusion of 130 mL of liposome a 1× dosing once every 4 weeks during the study period; 3) subjects will receive 130 ML of liposome at 2× dosing once every 4 weeks during the study period. Every six weeks each subject will have history, physical exam and repeat of the blood work done at baseline. Every 4 months they will have repeat magnetic resonance elastography (MRE) exam of the liver and FIBROSCAN® of the liver.

It is hypothesized that the targeted therapy reduces fibrosis and associated inflammation in human subjects, which can be measured directly with MRE, FIBROSCAN® or by liver biopsy. For example, it is expected that treatment with the present liposome can slow the progression of or reduce incidence of steatosis, lobular inflammation, portal inflammation and/or hepatocellular ballooning in subjects with NASH. The therapy will also decrease liver enzymes (ALT/AST, bilirubin) and could also potentially increase serum albumin. In some severe cases the therapy will also reduce associated abdominal ascites.

Example 3—Liposome Preparations

Additional liposome compositions were developed for therapeutic administration. The liposomal preparation comprises two phospholipids, cholesterol and alpha-tocopherol (vitamin E, VITE), and optionally polyethylene glycol (PEG). The phospholipids are 1,2 dilauryl-sn-glycerol-3-phosphocholine (DLPC) and 1,2-dipalmitoyl-sn-glycerol-3-phosphocholine (DPPC). In one example, the aqueous interior of the liposome contains 0.9% normal saline. The liposome can contain the following ratios of components:

TABLE 1

Sample Composition of Liposomes by HPLC

| | Liposomal Content (% composition by weight) |
|---|---|
| DLPC | 10-50% |
| DPPC | 10-50% |
| Chol | 0-5% |
| Anti-oxidant | 5-20% |
| mPEG-DSPE | 0-15% |

A comparison of the content of the present liposome with other liposomes currently in use for drug delivery is below, showing that the current liposome comprises a different composition that previously known liposomes, AMBISOME® used to deliver amphotericin B and DOXIL® used to delivery doxorubicin.

TABLE 2

Composition of Commerical Liposomes vs. Current Liposome

| Ingredients | AMBISOME | DOXIL (Stealth) | Sample Liposome |
|---|---|---|---|
| Total PC* | 17.75 mg/ml | 9.58 mg/ml | 40-50 mg/ml |
| Cholesterol | 4.3 mg/ml | 3.19 mg/ml | 0.5-5 mg/ml |
| Vitamin E/ Anti-oxidant | 0.05 mg/ml | | 2-10 mg/ml |
| PEG** | 7 mg/ml | 3.19 mg/ml | 5-15 mg/ml |

Numerous modifications and variations of the invention as set forth in the above illustrative examples are expected to occur to those skilled in the art. Consequently only such limitations as appear in the appended claims should be placed on the invention.

What is claimed:

1. A method for treating fibrosis comprising administered to a subject in need thereof an effective amount of phosphatidylcholine (PC) at a concentration of 30 mg/ml-70 mg/ml in a liposome or nanoparticle to treat fibrosis, wherein the liposome or nanoparticle comprises di-lauroyl phosphatidylcholine (DLPC) or a choline head with a phospholipid tail of 12 carbons at 10%-50% composition by weight and di-palmitoyl phosphatidylcholine (DPPC) at 10%-50% composition by weight or a choline head with a phospholipid tail of 16 carbons.

2. The method of claim 1 wherein the phosphatidylcholine is di-palmitoyl phosphatidylcholine (DPPC) or a choline head with a phospholipid tail of 16 carbons.

3. The method of claim 1 wherein the phosphatidylcholine is di-lauroyl phosphatidylcholine (DLPC) or a choline head and a phospholipid tail of 12 carbons.

4. The method of claim 1 wherein the liposome or nanoparticle further comprises an antioxidant.

5. The method of claim 4 wherein the antioxidant is a lipid soluble antioxidant.

6. The method of claim 1 wherein the liposome or nanoparticle further comprises vitamin E.

7. The method of claim 1 wherein the liposome or nanoparticle further comprises a factor that can stimulate new cell growth.

8. The method of claim 1 wherein the phosphatidylcholine binds to LHR-1 and or PPAR alpha.

9. The method of claim 1 wherein the liposome further comprises a factor that can stimulate new cell growth and an antioxidant.

10. The method of claim 1 wherein the liposome or nanoparticle further comprises cholesterol.

11. The method of claim 1 wherein the liposome is administered by injection, intravenously, transdermally, orally, via depot, or inhalation.

12. The method of claim 1 wherein the subject is suffering from a fibrotic disease, non-alcoholic steatohepatitis (NASH), non-alcoholic fatty liver disease (NAFLD), hepatitis, liver cirrhosis, lung fibrosis, chronic obstructive pulmonary disease (COPD), or interstitial pulmonary fibrosis.

13. The method of claim 12 wherein the subject is suffering from NAFLD or NASH.

14. The method of claim 1 wherein the liposome or nanoparticle is administered weekly, once every two weeks, once every three weeks, monthly, or once every two months.

15. The method of claim 1 wherein the subject is human.

16. The method of claim 1 wherein the liposome further comprises a pharmaceutically acceptable excipient, carrier or diluent.

17. A composition comprising a liposome or nanoparticle comprising total phosphatidylcholine (PC) at a concentration of 30 mg/ml-70 mg/ml in the liposome, wherein the liposome or nanoparticle comprises
   i) di-lauroyl phosphatidylcholine (DLPC) or a choline head with a phospholipid tail of 12 carbons at 10%-50% composition by weight; and
   ii) di-palmitoyl phosphatidylcholine (DPPC) or a choline head with a phospholipid tail of 16 carbons at 10%-50% composition by weight.

18. The composition of claim 17 wherein the liposome or nanoparticle further comprises i) an antioxidant; ii) vitamin E; iii) a factor that can stimulate new cell growth; and/or iv) cholesterol.

19. The composition of claim 17 wherein the liposome or nanoparticle comprises DLPC at 10%-50% composition by weight and/or DPPC at 10%-50% composition by weight.

20. The composition of claim 18 wherein the factor that can stimulate new cell growth is a GHK peptide.

21. A pharmaceutical composition comprising a composition of claim 17 and a pharmaceutically acceptable excipient, diluent or carrier.

* * * * *